United States Patent [19]
Elliott et al.

[11] Patent Number: 4,945,474
[45] Date of Patent: Jul. 31, 1990

[54] METHOD FOR RESTORING A DATABASE AFTER I/O ERROR EMPLOYING WRITE-AHEAD LOGGING PROTOCOLS

[75] Inventors: Linda C. Elliott; Gary R. Horn; Lloyd E. Jordan, II; Frank E. Levine; Cheng-Fong Shih; William W. Myre, Jr., all of Austin, Tex.

[73] Assignee: Internatinal Business Machines Corporation, Armonk, N.Y.

[21] Appl. No.: 179,195

[22] Filed: Apr. 8, 1988

[51] Int. Cl.$^5$ .................. G06F 11/00; G06F 15/40
[52] U.S. Cl. ............................. 364/200; 364/283.4; 364/265.5; 364/266.5; 364/246.9
[58] Field of Search ... 364/200 MS File, 900 MS File, 364/300

[56] References Cited

U.S. PATENT DOCUMENTS

| | | | |
|---|---|---|---|
| 3,736,566 | 5/1973 | Anderson et al. | 364/200 |
| 4,044,337 | 8/1977 | Hicks et al. | 364/200 |
| 4,498,145 | 2/1985 | Baker et al. | 364/900 |
| 4,507,751 | 3/1985 | Gawlick et al. | 364/900 |
| 4,648,031 | 3/1987 | Jenner | 364/200 |
| 4,686,620 | 8/1987 | Ng | 364/200 |
| 4,697,266 | 9/1987 | Finley | 364/200 X |
| 4,751,639 | 6/1988 | Corcoran et al. | 364/200 |
| 4,814,971 | 3/1989 | Thatte | 364/200 |
| 4,815,028 | 3/1989 | Saitoh | 364/900 |
| 4,819,156 | 4/1989 | DeLorme et al. | 364/200 |

OTHER PUBLICATIONS

"Data Recovery in IBM Database 2", R. Crus, *IBM Systems Journal*, vol. 23, No. 2, 1984, pp. 178-188.
"Minimizing Logging to Facilitate Recovery of Tablespace", *IBM Technical Disclosure Bulletin*, vol. 29, No. 8, Jan. 1987.

*Primary Examiner*—Thomas C. Lee
*Attorney, Agent, or Firm*—Robert M. Carwell

[57] ABSTRACT

Method for reducing data loss during I/O errors and power failure during non-atomic writes to media in a transaction management system using write-ahead logging protocol. A recovery log is written during forward processing. On system restart processing, the log is traversed and a REDO executed. Recovery is effected from detected incomplete log writes or log write failures and uncommitted transactions are undone. A technique is provided in which files having I/O errors are identified, whereby subsequent restart operations are prevented from accessing these files. In one embodiment index files with such error are renamed, serving to indicate that corresponding original files contain errors, and the error index files are automatically rebuilt whereby I/O error on the files causes no data loss. The index file rebuild does not invalidate access plans related to the failed index.

9 Claims, 10 Drawing Sheets

|   10            |   12            DATA |   14                           |
|-----------------|----------------------|--------------------------------|
| EMPLOYEE NAME   | EMPLOYEE NUMBER      | EMPLOYEE COMPRESSED IMAGE DATA |
| ANDREW          | 1                    | PICTURE OF ANDREW              |
| BAKER           | 3                    | PICTURE OF BAKER               |
| CHESTER         | 8                    | PICTURE OF CHESTER             |
| EDGAR           | 15                   | PICTURE OF EDGAR               |
| EDWARDS         | 24                   | PICTURE OF EDWARDS             |
| HOWELL          | 7                    | PICTURE OF HOWELL              |

FIG. 6   FORWARD PROCESSING (NORMAL)

METHOD FOR RESTORING A DATABASE AFTER I/O ERROR EMPLOYING WRITE-AHEAD LOGGING PROTOCOLS

BACKGROUND ART

In the development of information processing systems, relational database management programs evolved allowing the user to search, access and alter data contained in numerous different database tables by using specific fields common to all such tables.

As these database systems improved, the speed and efficiency of access to these records in the database increased and additional capability was provided. For example, more recent data processing systems began to provide support for multiple simultaneous users enabling each user to even access data concurrently at a sub-page level.

Notwithstanding such improvements, one area that remained of great concern was in providing for recovery of data, such as, after I/O or power failures, i.e., system crashes. One reason for this was the vast amount of time and money which became associated with the compilation of data resident in the database as well as the great dependence which users came to have on their increasingly vital database resources. Accordingly, a great deal of development effort was expended in attempting to solve the problems associated with such data loss.

Perhaps one of the most obvious general approaches to the problem was to provide for redundancy whereby backup copies of the data were available in the event that the database or portions thereof needed to be reconstructed due to such incomplete log writes or detected log write failures. Accordingly, several techniques were developed in the art for providing such redundancy, one of the earliest being known as shadow paging which essentially involves retaining a copy of an entire page of data while updates were made to a second copy. After the newer copy containing the changes was safely written to the permanent medium, the archival copy could thence be written over. This technique was employed for example in the database product of the IBM Corporation known commercially as SQL/DS. A survey of various systems employing this shadow copy technique may be found in "File Servers for Network Based Distribution Systems", Liba Svobodova, *ACM Computing Surveys*, Vol. 16, No. 4 (December 1984), pages 353-399.

Although shadow paging appeared to be a viable solution in some environments it was not without its disadvantages including the expense and space involved in maintaining such shadow copies. Accordingly, database systems began implementing the transaction recovery facility by only writing changes to database records to both the changed record and to a database recovery log. The information recorded in the database recovery log insured that changes of committed transactions were incorporated into the database state during system restart following a system failure (as well as allowing changes to database records to be reversed or undone in support of transaction rollback for uncommitted transactions).

A form of this technique became developed known as write-ahead logging wherein the protocol required that changes be written to the recovery log in the permanent file prior to being made to the actual database records themselves. One problem with such logging related to the aforementioned desirability of concurrency wherein multiple users could simultaneously access the database desirably at a sub-page level, the need for such concurrency being translated for example into a need for concurrent access to index files commonly used by database programs to provide quick and efficient access to records.

Information contained in index nodes of these index files was extremely important in providing key record information that was frequently deleted or inserted as records were deleted or inserted into the database tables, and consequently such concurrent accessibility on a sub-page level was highly desirable. A particularly important aspect of such index files was that individual fields of a record in a database might frequently logically contain data which was not kept in the record for itself but rather, (by means of a pointer or descriptor) kept in a separate file. Example of such a file is known as a long field file, wherein a long field is contained, which may have an image associated with large data set type items such as audio or image data which can be extremely valuable, thus illustrating the importance of such indexes.

With the foregoing in mind, it will be appreciated that it was desirable to provide for a database recovery system of the write-ahead logging type which nevertheless provided for such sub-page level concurrency. Systems were accordingly developed such as those described in U.S. Pat. Application Ser. No. 07/059,666, filed Jun. 8, 1987, and entitled "Method for Managing Sub-Page Concurrency Control and Partial Transaction Rollback in a Transaction-Oriented System of the Write-Ahead Logging Type", now abandoned, and refiled On Sept. 7, 1989, as pending continuation Ser. No. 07/406,186, as well as pending U.S. Pat. Application Ser. No. 07/115,146, filed Oct. 30, 1987, and entitled "Method for Concurrent Record Access Using an Index Tree", U.S. Pat. No. 4,914,569. An additional reference that discusses these index files such as those commonly configured in a B-tree structure known in the art is "Efficient Locking for Concurrent Operation on a B-Tree" by Lehman and Yao, *ACM Transactions on Database Systems*, Vol. 6, No. 4, (December 1981), pages 650-670, the hereinbefore noted references being incorporated herein by reference.

Notwithstanding the aforementioned advances, problems nevertheless remained in providing for effective database recovery First on restart processing of such systems, files with I/O errors were not readily detectable so as to prevent and safeguard restart operations from accessing the files with attendant data loss. Further, means were not provided for readily detecting incomplete log writes or detected log write failures in order to stop the further writing of transactions. Moreover, no effective means was provided for readily identifying such error files during restart. Additionally, rebuilding of error file indexes was by no means automatic but rather required explicit user action and invalidated access plans related to the failing index.

Accordingly, systems and methods were desired for reducing data loss due to I/O errors and power failure during non-atomic writes to disk in a transaction management system using write-ahead logging protocol. Such systems and methods were highly sought whereby I/O error on index files, including system tables, caused no data loss. Also, techniques were desired for providing automatic recovery from the errors without an explicit user action to rebuild the affected indexes. Means were desired whereby power failure during log file writes caused no data loss without the necessity for employing double writes, shadow paging or the like. It was further highly desired to provide effective means whereby I/O error on user tables had limited data loss effect to the table in error. Additionally, it was desirable to provide a technique for index file rebuilds which did not invalidate the access plans related to the index. These and other desired features not met by the prior art are provided by the subject invention as hereinafter described in greater detail.

DISCLOSURE OF THE INVENTION

A system and method is provided for data recovery due to database system crashes during non-atomic memory writes wherein a transaction management system with write-ahead logging protocol is employed. In a preferred embodiment log records are written during normal processing. The recovery log is traversed during REDO insuring completion of logged operations. Recovery from detected incomplete or failed log writes is effected and non-committed transactions undone. Files with I/O errors are detected and flagged preventing subsequent RESTART operations from accessing the files. The system further provides for automatic rebuilding of error index files as part of the RESTART procedure without requiring explicit user action for invalidating access plans related to the failed index.

During normal processing flagged data file error is reported to the application attempting access thereto. Flagged long field file error is however reported to the application only when the application attempts use of the particular long field file. Flagged index file error effects rebuilding thereof without error status to the application when the system accesses the underlying data file or the application accesses the index file to access the correlative data records. Loss of previously committed data as a result of detected I/O error on index files and log write failure or power failure during log write is avoided.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

In order to better understand the invention, first with reference to FIGS. 1-4 a more detailed description of representative data and the manner in which it is stored in a database system will be given using the illustration of the employee table of FIG. 1. With reference to FIG. 3, an example will be given of the concept of a database index. Next, with reference to FIG. 4, the use of such index information of FIG. 3 will be illustrated in accessing a particularly important form of files shown in FIG. 4, i.e., long field files. As will become more apparent, these indexes actually reference corresponding data records which in turn reference correlative long fields.

Next, a general description of the overall operation of the invention in a system restart mode and the restart redo and restart undo phases will be given with reference to FIG. 5. This will be followed by a more detailed discussion of operations during the redo with reference to FIGS. 7 and 8 and a more detailed description of system operation after the system restart shown in FIG. 5 with reference to FIG. 11.

Figures 1, 3:
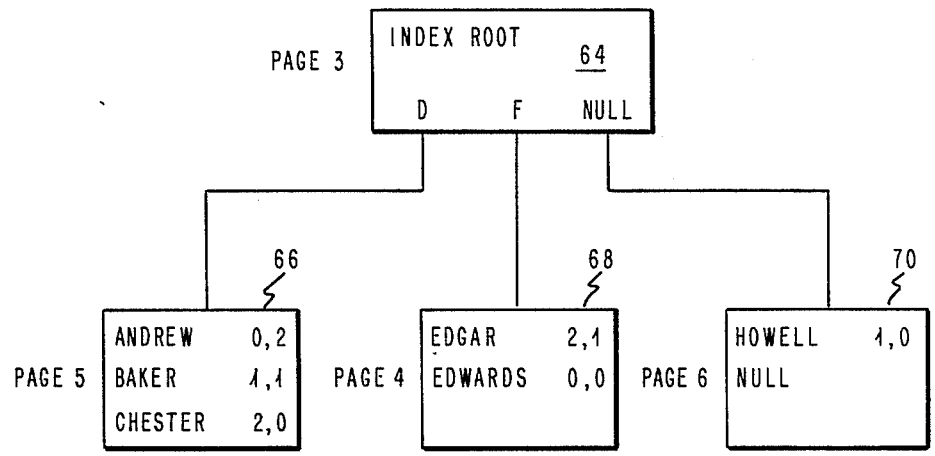
FIG. 1 is an illustration of a database table.
FIG. 3 is an illustration of an index B-tree for the database table of FIG. 1 as it would be stored conceptually in media.

FIG. 1 conceptually represents an example of actual data that a user may have entered in a database. This data is essentially in this example a list having headers such as employee name 10, some form of employee number 12, and some type of image data 14 such as a corresponding employee picture. Thus, the first record in this table is Andrew, employee number 1, and data comprising a picture of Andrew. Similar records appear for other employees entered into the database.

Figure 2:
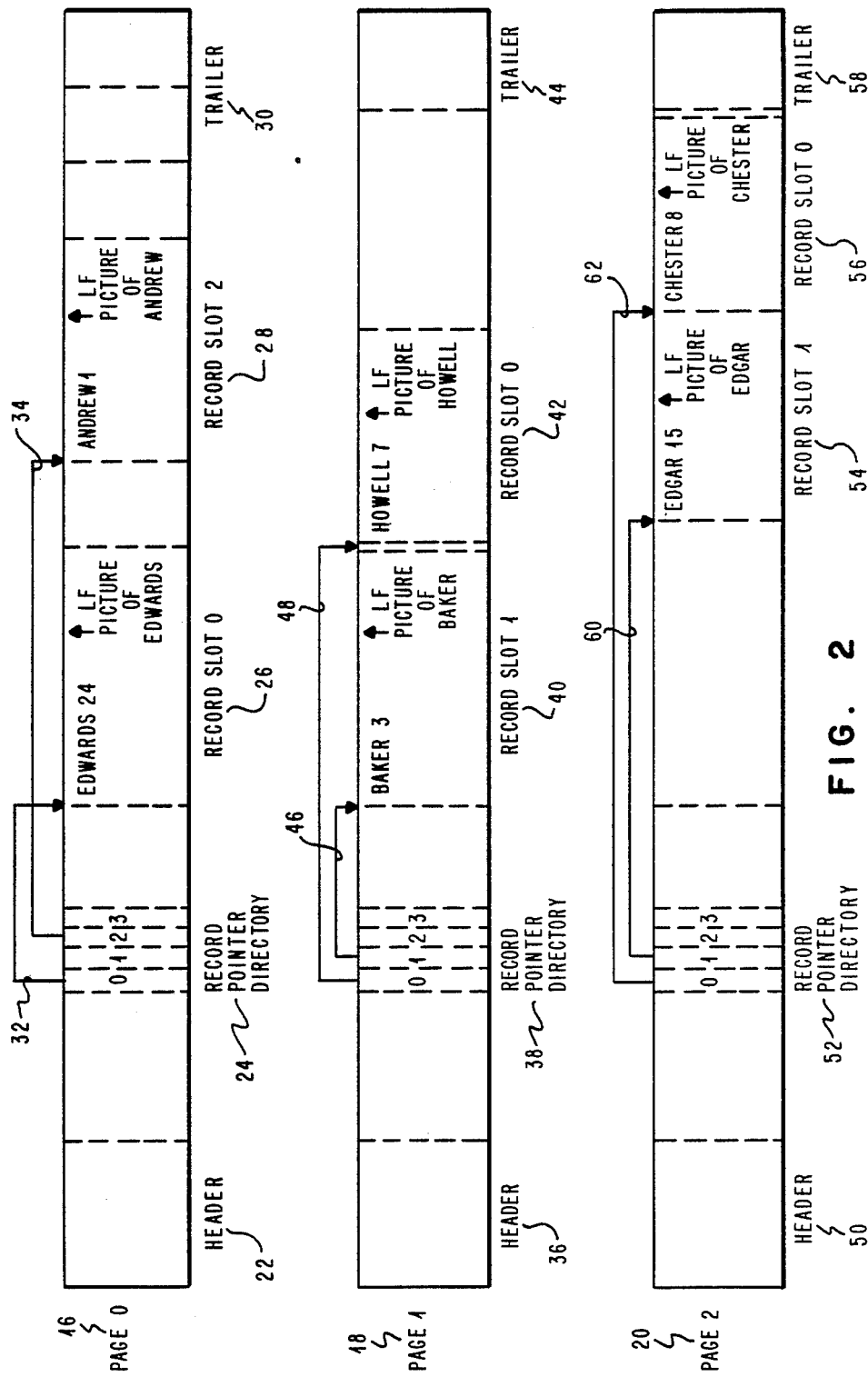
FIG. 2 is an illustration of data pages of the database table of FIG. 1 conceptually as they would be stored in media.

FIG. 2 is an illustration of the file representing part of the table data of FIG. 1 as it might be stored on computer disk. The file represents, sequentially, data pages such as pages 0-2 (reference numerals 16, 18, and 20, respectively) each having some of the records of the FIG. 1 table. Each data page has a header and trailer. Page 0, for example, has 22 for the header and 30 for the trailer; page 1 has 36 and 44; and 20 has 50 and 58 for the header and trailer, respectively. The header and trailer each contain a log sequence number or LSN. This LSN is copied from the header to the trailer prior to writing out a page. After reading back a page, the header and trailer are compared to make sure that they are identical in order to verify that the previous write was completed.

Referring more particularly to page 0 (reference numeral 16), there is a record pointer directory 24 which has a first slot 0 pointer 32. This points to the record 26 which itself contains the name "Edwards", the serial number "24", and a pointer to a long field file containing video data of Edward's image. The next slot in record pointer directory 24 is not used in this example, i.e., it contains no pointer pointing to another long field file with video data. Slot 2 has a pointer 34 pointing to record 28, which, in turn, contains a pointer to a long field containing video data of Andrew's image In summary the indexes will point to data records directories containing pointers to records. These records contain names, serial numbers and long field descriptors or pointers to the actual long field image data.

Similarly, the page 1 (18) has a record pointer directory 38. In this case a slot 0 pointer 48 points to record 42 containing Howell's data wherein a long field pointer to the image data resides. The slot 1 pointer 46, points to a record 40 containing a long field pointer to a long field containing Baker's image data. Similarly, for page 2, the record pointer directory 52 has a slot 0 having a pointer 62 which points to a record 56. This record contains a long field pointer to image data of Chester in a corresponding long field file. Slot 1, in like manner, has a pointer 60 which points to record 54 having, in turn, a pointer to a long field wherein Edgar'image data resides.

The long fields, as is well known in the art, are where the actual digitized video data of the images are stored, preferably in a compressed format. Thus, the pointers 32, 34, 46, 48, 60 and 62 to the records, and the records contain actual indicated displacements to the beginning of their respective long field files wherein image data resides. As an example in FIG. 2 the pointer 62 points to a record 56 which would contain a number corresponding to 1098 (as shown in the top portion of FIG. 4) which is the beginning of the segment directory to the long field where the compressed image data of Chester 82 resides.

In relational databases, it is necessary to efficiently access the data such as that of Table 1, FIG. 1. This is conventionally done by means of an index file, an example of which is schematically illustrated (for the Table 1 data) in FIG. 3, in a manner well known in the art. FIG. 3 depicts an index for Table 1 wherein the index is in the form of a two level tree. The root level on page 3 (64) of the database file has pointers to the three leaves or nodes 66, 68 and 70. These nodes have index data stored in pages 5, 4, and 6 of the index file, respectively. D, F, and "null" in page 3 (64) of the index file each represent the highest possible "key" in the particular node 66, 68, 70 to which they point, respectively. In this case, a key is the first alphabetic character of the employee name although in other applications wherein numeric data is stored the keys may be numbers. Andrew, Baker, and Chester have first alpha characters less than D and thus indexing data related to them are stored in node 66. F in root 64 points to node 68 which contains Edgar and Edward's indexing data because their first alpha characters are less than F but greater than D. The null pointer of root 64 is the highest allowable key and thus points to the last leaf 70. Leaf 70 contains Howell since its first alpha, H, is greater than F (the highest key in the preceding node 68).

The significance of the numbers in FIG. 3 following the names is that they represent the record identifications or i.d.s of their respective names. For example, for node 66, Andrew 0,2 indicates that the image data for Andrew may be located by first retrieving the location 34 of record 28 containing the long field pointer from page 0's record pointer directory 24, slot 2, and thence retrieving the actual long field data at 92 (FIG. 4) pointed to by the long field pointer contained in record 28.

Figure 4:
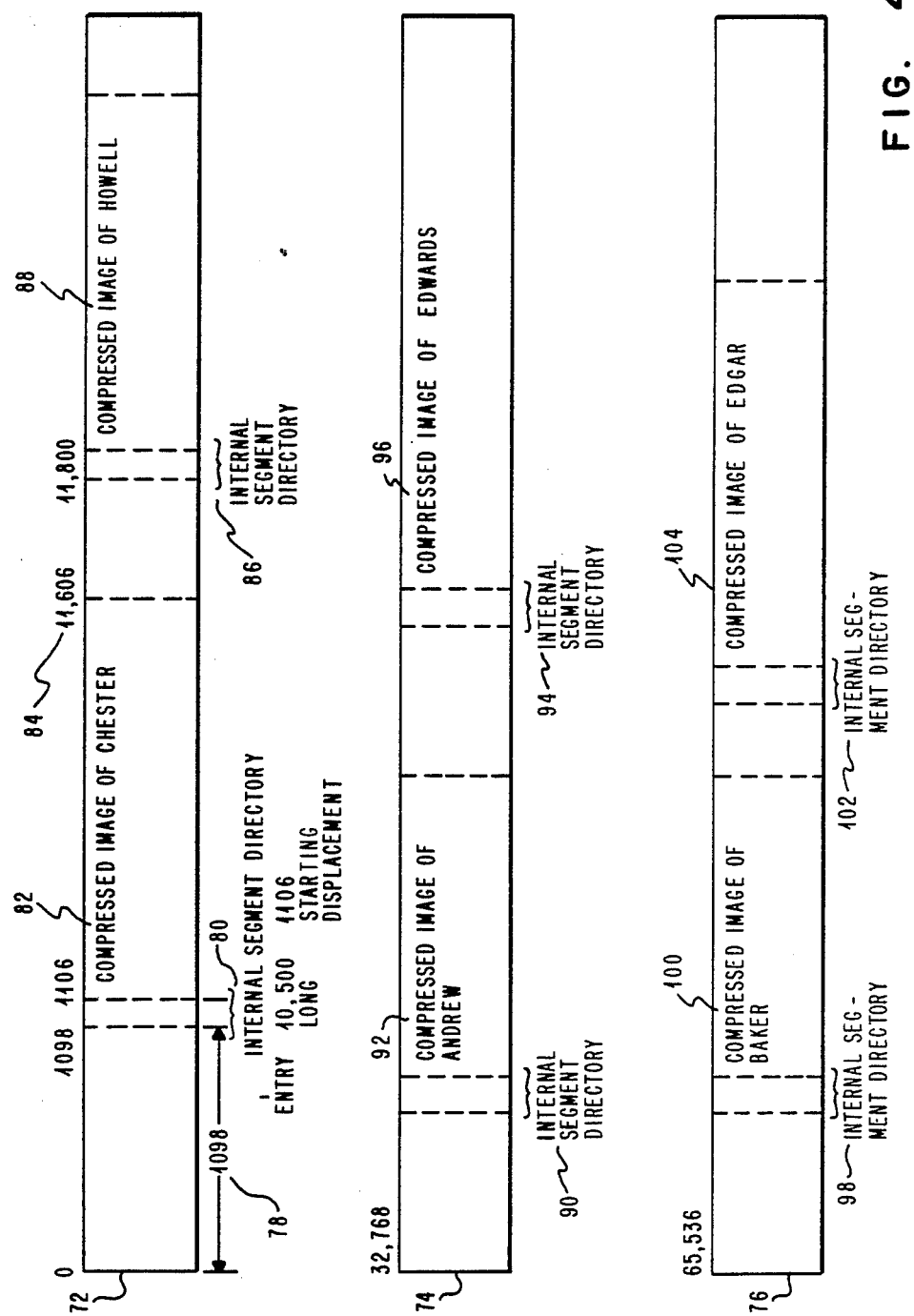
FIG. 4. is an illustration of long field file data corresponding to the employees in the table of FIG. 1.

FIG. 4 is an illustration of the storage of long field files in a computer disk. Reference numeral 72 indicates the beginning of a long field file having the first image data at 82. An internal segment directory for each image provides details about the respective image data. Thus directory 80 for Chester's image data 82 indicates one entry with a length of 10,500 bytes and a starting displacement at 1106. Similarly, in reference number 18, page 1 of FIG. 2, the long field pointer in record 42 to image data of Howell would point to 11,800, (FIG. 4) the beginning of the internal segment directory 86 for the actual image data 88 of Howell.

With reference to beginnings 74 and 76 of additional long field data, appropriate correlative long field file pointers depicted in FIG. 2 would point to corresponding internal segment directories 90, 94, 98, and 102. These directories, in turn, would contain details about their respective actual compressed image data 92, 96, 100, and 104 relating to Andrew, Edwards, Baker, and Edgar. It will be noted that although in the embodiment herein depicted the segment directories appear in the long field areas, these areas may if desired carry only image data, in which case the segment directories may appear as a matter of choice in the records depicted in FIG. 2.

Now that a clearer understanding has been gained of the roll of indexes in database systems an example of which is in accessing and updating through a pointer found from the index an important type of database file just described, namely the long field file, the overall operation of the recovery system of the present invention will be described with reference to FIG. 5.

When a system restart begins, 260, log records will begin to be read in, 262. Each log record will contain an indication of a particular page to which the log record and the database action contained therein relates. Essentially the software through steps 260-272 will read in the data pages referenced by these log records or the LSNs associated therewith in order to verify that the database operations or actions of the log records have been done - this phase being referred to as the system restart-redo phase. At 266 for a particular log record, the associated page file TYPE such as a data, index, or long field file is identified. The particular page is then read by the system, 268, and a check is made at 270 as to whether the LSN on the page just read in is equal to or greater than the LSN of the associated log record. If Yes, it is known that the operation identified in the log record has been completed and the process loops back to read the next log record at 262. If, however, the check yields a No, this indicates that the original database action or operation associated with the log record just read must be redone, 272. The basic idea, thus, per the aforementioned U.S. Pat. Application Ser. No. 07/115,146, now U.S. Pat. No. 4,914,569. (Write-Ahead Logging Protocol), is that the entire log file is read until no more log records are left, as checked at 264, whereupon if Yes at 264, this indicates that all history has been repeated and the restart-redo phase has been completed. Thus, exiting the decision block 264 at Yes signifies that now all logged transactions which did not commit must be rolled back, and accordingly the system restart-undo phase is entered at 274.

Generally, during this undo phase, each log record representing uncommitted transactions is undone in time order, i.e., all log records are checked in the backward direction to see if they are part of uncommitted transactions. If so, an abort is performed on the log record. This undo phase may be seen represented by steps 274-282 of FIG. 5.

More particularly, the previous log record is read at 276 and a check is made as to whether any log record has been found at 278, If not, a check is made at 279 of whether during system profile or configuration the user specified a request that error indexes automatically be recreated. If No, normal operation resumes at 281, i.e. system restart is completed. If Yes the software program performs step 284. This corresponds to what transpires right after the system restart operation of FIG. 5. Wherein the process exits to complete recreation of error index files as shown in more detail with reference to FIG. 11.

As previously noted regarding the purpose of the start-undo phase, when a log record is found, the check at 280 determines whether the specific log record is associated with an uncommitted transaction. If Yes, the system performs and undo of the database action identified in the log record at 282 whereupon the process loops back to read the next previous log record, 276. If, of course, the particular log record under consideration is not involved in an uncommitted transaction at 280, the process loops back to 276 to read the next previous log record without performing any undo operation such as that of step 282.

Figure 5:
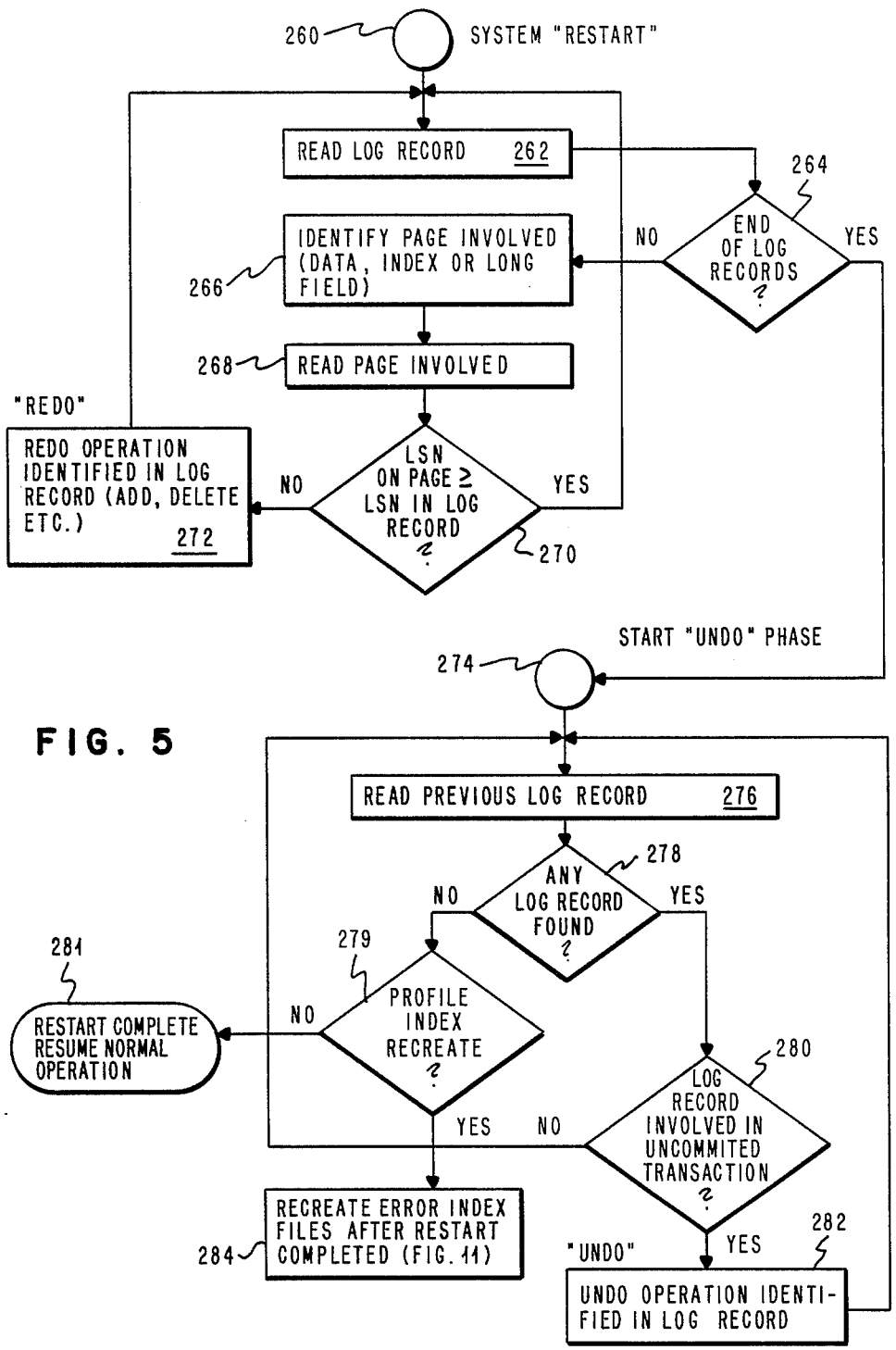
FIG. 5 is a flow chart illustrating the overall operation of various components of the invention.
Figure 7:
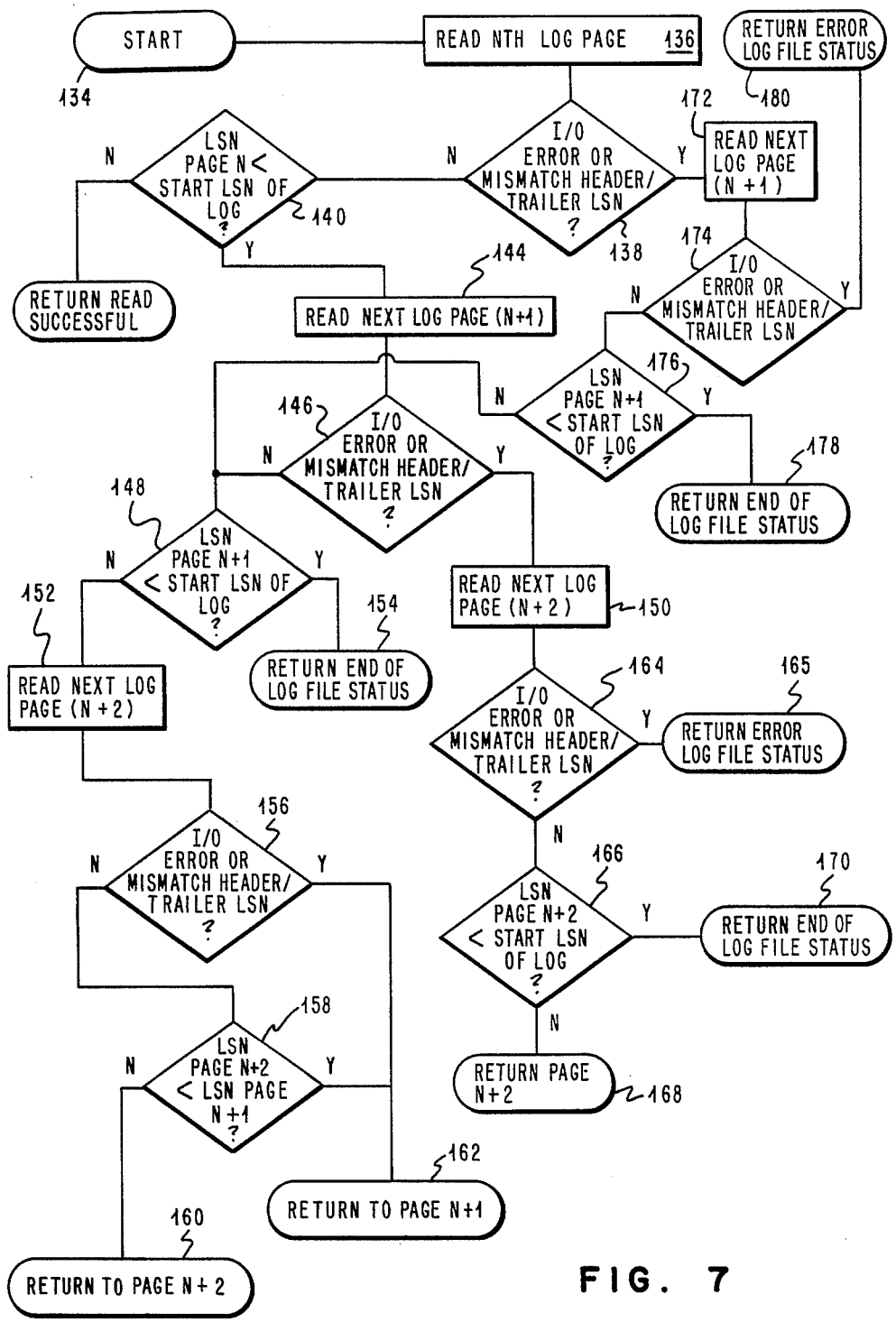
FIG. 7 is a flow chart illustrating the processing of the log pages written according to the method of FIG. 5 and the handling of error detected during database restart processing.

With reference to the steps 262 and 266 at the top of FIG. 5, it is of course obvious that a page must be read to obtain a log record as shown at step 136 of FIG. 7. In addition to describing in more detail such operation of reading log pages as shown in FIG. 7, the steps of FIG. 7 also indicate operation of the system of the present invention when errors are encountered in reading pages. For example, in one case wherein the page is found with a log error, the process may continue to step 268. If on the other hand, for example, I/O errors occur on both pages such as indicated at 180 of FIG. 7, a fatal error has occurred causing a return error log file status. Another case with reference to FIG. 7 is when an end of log file status is returned such as 170, this obviously indicating with reference back to FIG. 5 again that the step 264 is reached in the process whereby all history has been repeated, i.e., the restart-redo phase is completed.

In like manner to FIG. 7 providing more detail as to steps 262 and 266, FIG. 8, to be hereinafter described in greater detail, provides more details as to the steps actually involved in reading pages from the data, long field, and index files as shown at step 268 of FIG. 5. Particularly shown are steps effected upon encountering an error in reading a page from the file at 184, and 186 of FIG. 8 wherein the file is renamed at 194 and whereupon the process loops back on the Yes path exiting block 270 to read the next log record per step 262.

Figure 8:
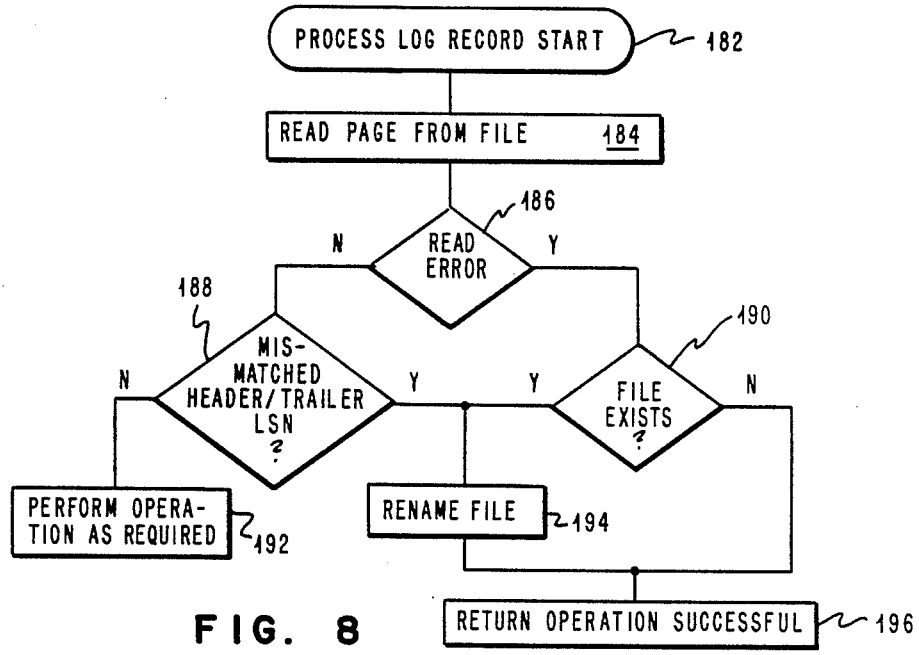
FIG. 8 is a flow chart illustrating the detection and processing of an error on a data, index, or long field file during database restart processing.
Figure 10:
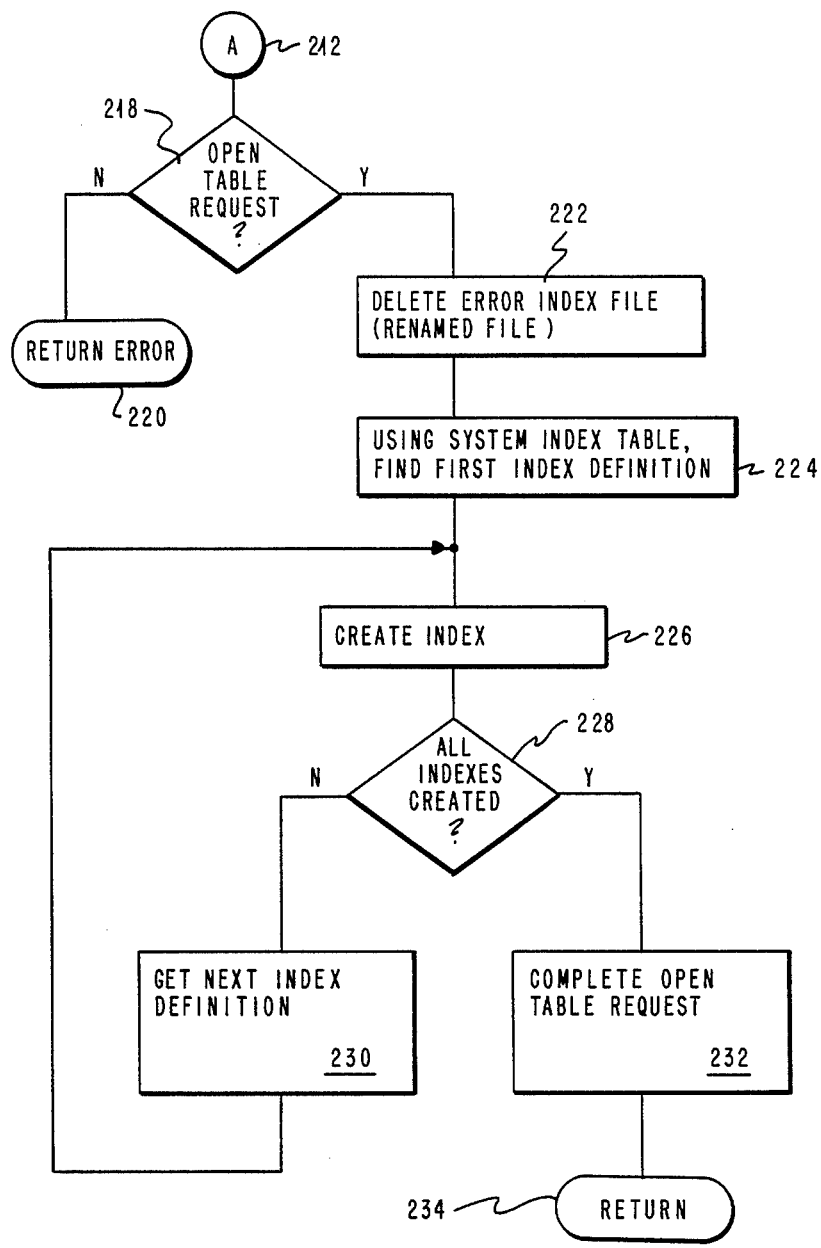
FIG. 10 is a flow chart illustrating an error index file processing during normal non-database restart index processing.
Figure 11:
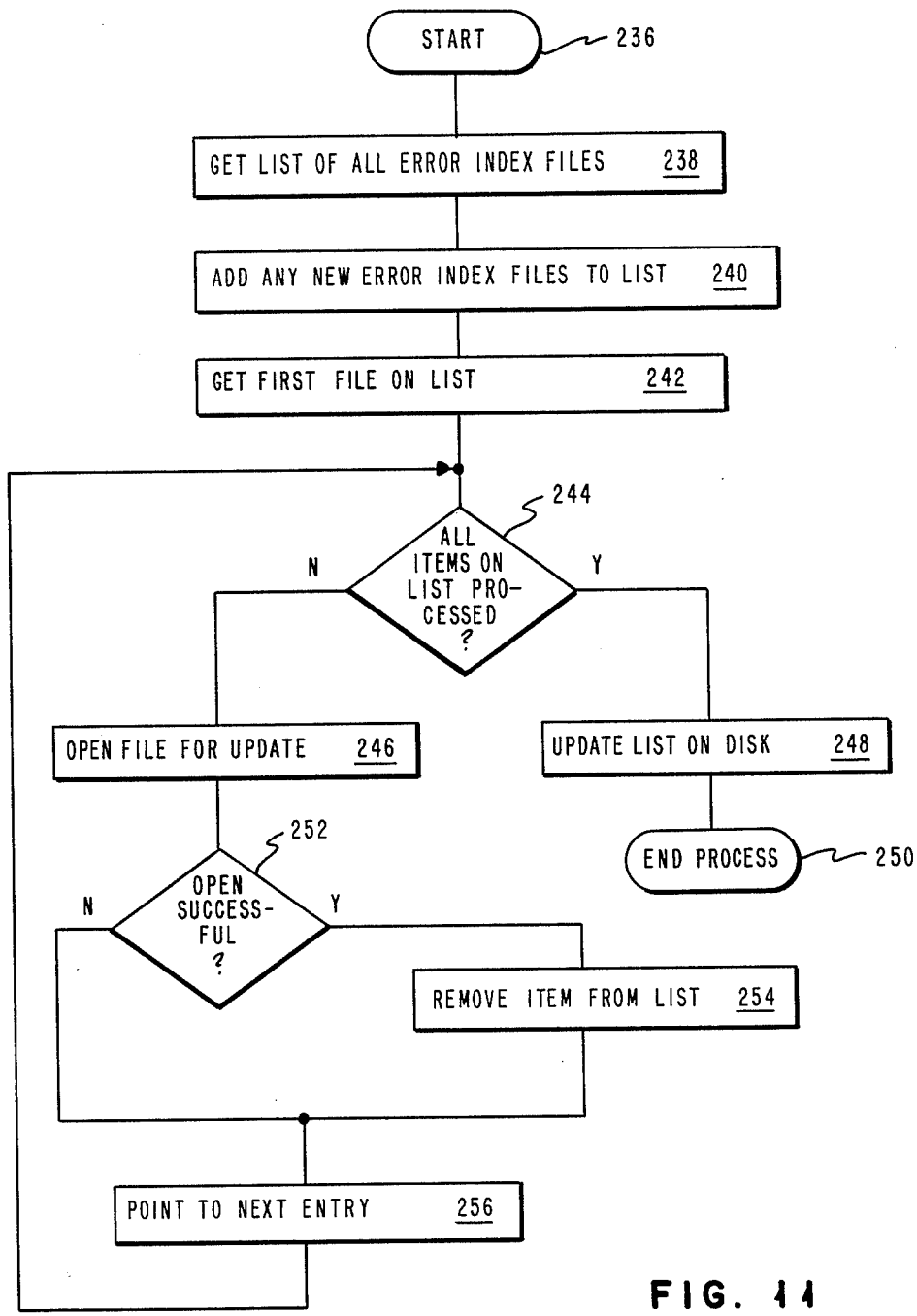
FIG. 11 is a flow chart illustrating the recreation of error index files after completion of system restart.

Thus, it will be noted that FIGS. 7, 8 and 11 relate to operations of the invention during system restart. Specifically FIG. 7 details the processing of log pages and handling errors detected during the restart. FIG. 8 details the detecting and processing of errors relating to the actual data, index, and long field files during restart, and FIG. 11 details the steps in recreating error index files after completion of restart-undo. In contrast, FIGS. 6, 9 and 10 relate to the normal forward processing operations of the database system. More particularly, FIG. 6 details the writing of log pages during such normal processing, FIG. 9 details processing of read errors conventionally encountered in normal database operations, and FIG. 10 describes error index file processing during such normal, i.e., non-restart, index processing during conventional operation of the database system.

Figure 6:
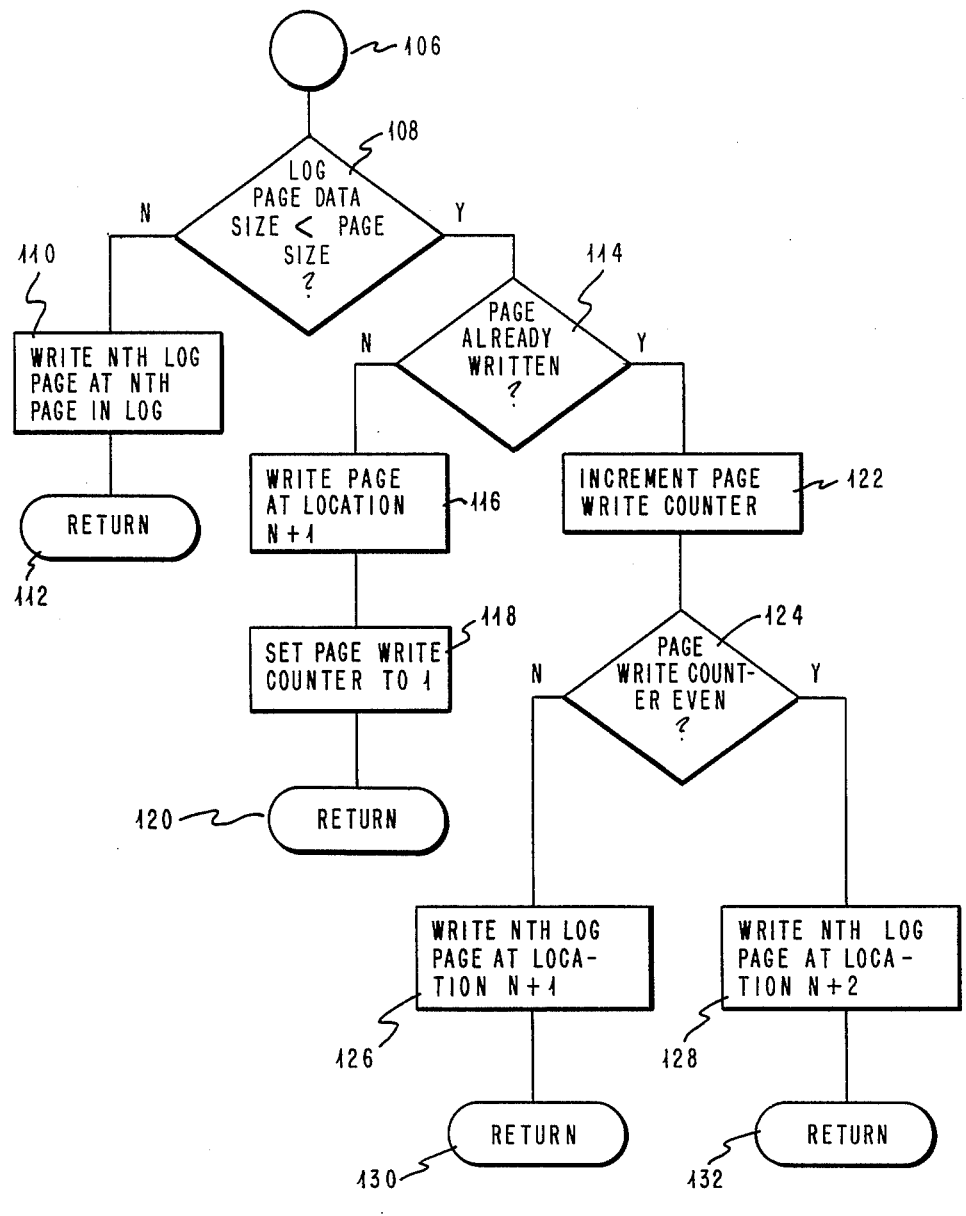
FIG. 6 is a flow chart illustrating the method of writing log pages to media.

FIG. 6 is a flow chart illustrating the method of writing log pages to a computer media such as a hard file. Generally the system is in an "append" mode whereby log records are continuously being added or written to the recovery log. Periodically a long page is then written out to disk. 106 indicates the start of writing log pages to disk in response to a requester function which has issued a commit. Eventually the log record requested by the requester function will be written out to a page after the requester has issued a commit, however it will be appreciated that the process depicted in FIG. 6 will occur before the page is actually written out. At commit time it is desirable to write out the log page containing the data of all the log records created up to that point.

At 108, the process inquires as to whether the log page to be written is filled or not. If the log page is not filled (i.e., the log page is less than the page size), a partial page is indicated and the process proceeds to 114 wherein it is determined whether that page has already been written. If not, the process proceeds to 116 and the page is written at location n+1. Next the page write counter is set to 1 at 118, and there is a return 120 to the caller of this routine which started at 106 and which actually completes the algorithm to write a page out.

In block 114, if the page has already been written, exiting on the Yes branch occurs to 122 where the page counter is incremented. If the page counter is even (as determined at 124) then the process proceeds to 128, causing the nth log page to be written at location n+2. If at 124 the page write counter is odd, then the procedure goes to 126 where the nth log page is written at location n+1. In either case, return is then effected at 130 or 132 to the requester or caller of this routine. Returning to 108, if the log page size is not less than the page size (that is to say a complete page has been filled) the process moves to step 110 wherein the nth log page is written at location n, and thence the process returns at 112 to the caller.

FIG. 7 is a flow chart illustrating the processing of log pages and the handling of an error detected during database restart processing. 134 is the start of this processing wherein at 136 the nth log page is being read in. If, after reading in the log page, it is determined at 138 that there is an I/O error or a mismatch of the header and trailer LSNs, then at 172 the next log page n+1 is read in. If there is I/O error or mismatched LSN, determined at 174, then an error status is returned, 180. In this particular case at 180 the database could not be recovered and must thence be restored from a backup copy. If, at 174, there is no I/O error or mismatched header-trailer LSN's, then decision block 176 is reached. If the LSN of page n+1 is less than the start LSN of the log, then it is known that this page has not previously been written out and the process proceeds to 178. At 178 end of log file status is returned, indicating processing of all pages has been completed.

Continuing in FIG. 7 with the "No" branch of 176, if the LSN of page n+1 is greater than or equal to the start LSN of the log, then processing continues at 148 wherein the LSN at page n+1 is checked to see whether it is less than the start LSN of the log. If it is, then this process of FIG. 6 is completed and an end of log file status is returned at 154. In 148, if the LSN of page n+1 is not less than the start LSN of the log, at 152 the next log page n+2 is read. After reading that page, at 156 it is determined whether an I/O error or mismatched LSN header/trailer has occurred. If so, then the log records from page n+1 are used and we return to the caller at 162. Returning back to 156, if there is no I/O error or mismatch, at 158 it is determined whether the LSN for page n+2 is less than the LSN for page n+1. If so, again the process returns page n+1 at 162. If not, the process returns page n+2 as shown at 160. At this stage the process is simply determining the page with the highest LSN and returning that page. So long as there is a valid LSN, i.e., one which is greater than the beginning of the log, the process will continue returning the highest page of the two alternate pages which could be written out if an I/O error or mismatch is encountered. It will be noted that in referring to returning pages actually specific page numbers are returned and then the appropriate records from the numbered page.

Returning to decision block 138, after reading in the nth log page at 136 a check is made to determine whether an I/O error or mismatched header/trailer LSN has occurred. If not, at 140 a check is made of whether the LSN page n is less than the start LSN of the log. If so, this indicates that work has occurred only on pages n+1 or n+2, and flow to 144 then occurs wherein the next log page n+1 is read. However, if the LSN of page n is greater than or equal to the start LSN of the log, this indicates that the page has been read in successfully and is the correct page to use, and consequently a read successful status is returned per 142.

Returning back to 144, after reading in the next log page n+1, a check for I/O error or mismatched header/trailer LSN is made at 146. If mismatching or error is detected then the next log page n+2 is read in per 150. Next, I/O error or mismatch of this page is checked at 164. If mismatch or error is detected per the Yes branch exit from 164, then at 165, an error log file status is returned. On the other hand, if error or mismatch is not detected at 164, then at 166 the check is made for whether the LSN of this n+2 log page is less than the start LSN of the log. If so, an end of log file status is returned at 170. On the other hand, if the LSN of page n+2 is equal to or greater than the start LSN of the log, then page n+2 is returned at 168.

FIG. 8 is a flow chart illustrating the detection and processing of an error on any data file, index file, or long field file during database restart processing. Processing starts at 182 wherein beginning of processing a log record occurs. The log record, it will be recalled, identifies the page and file from which to read the particular desired data, index or long field file data. At 184, a page specified from the log record is read. At 186, the check is made for any read error. Upon read error detection, at 190 the check is made to see if the file wherein the read is being attempted exists. If not, at 196 a successful operation is returned. If the file does exist, then at 194 the file is renamed and again a successful operation is returned at 196. Returning to 186, if no read error occurs, a check is made at 188 to determine whether a mismatched header/trailer LSN exist. If so, again at 194 the file is renamed and a successful operation is returned at 196. If, on the other hand, at 188 no mismatched header/trailer LSN is detected, operations will then be performed at 192 which would have normally occurred, these operations being whatever the log record requires to be done at this point. This may, for example, be the redoing of a particular operation, adding a key if required at the time, or the like. Finally, with reference to FIG. 8, after recovery, error file identifying information can be captured and placed in a table or on disk. A preferred method, however, would be to store such information in a bit map.

Figure 9:
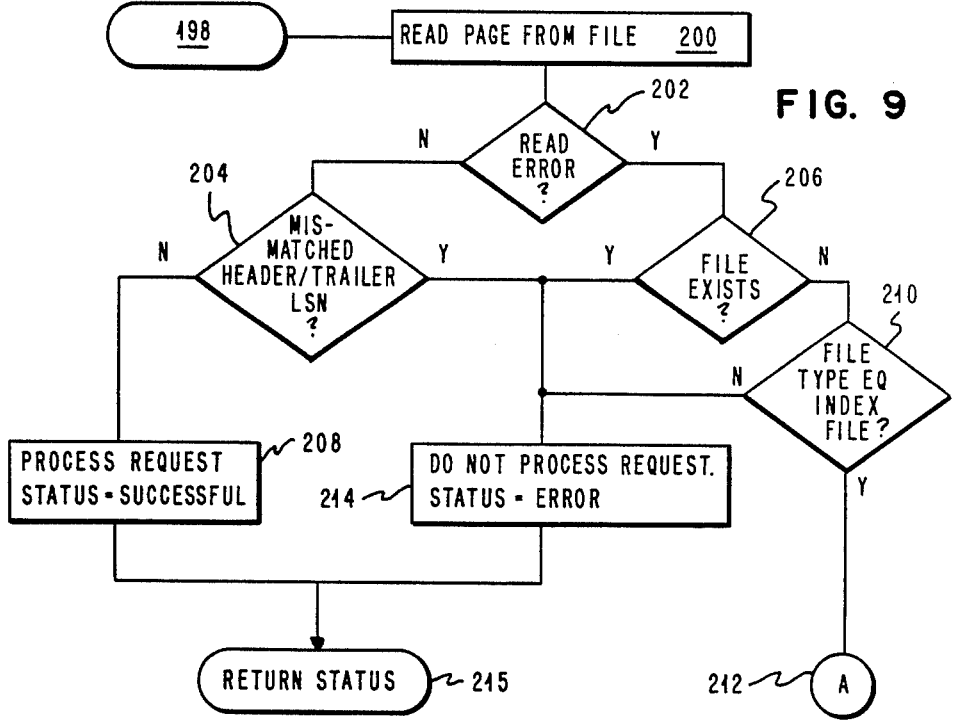
FIG. 9 is a flow chart illustrating an error file processing during normal non-database restart processing.

FIG. 9 is a flow diagram illustrating error file processing during normal processing, i.e., during non-database restart. Processing begins at 198, after which a request to read a page or file at 200 is executed. A read error is checked at 202, and if it occurs, a check is made at 206 to determine whether the file exist. If so, at 214 a status equal to error is set and the request is not processed whereupon at 215 the status is returned.

Returning to a file existence check at 206, if the file does not exist, then a check is made of whether a file type is an index file at 210. If not, then the process proceeds to 214 where again the . request is not processed and a status equal error is returned at 215. If, on the other hand, the file type as checked at 210 is an index file, then at 212 the process continues as shown in FIG. 10. Returning to 202, if a read error is not detected, then at 204 a check is made for mismatched header/trailer LSN's. If mismatch is detected, then again at 214 and 215 the process request is refused. If, on the other hand, the header/trailer LSN's match, then at 208 the request is processed and the status is set equal to successful, and that status is returned at 215.

Returning now to FIG. 10, this is a flow chart illustrating error index file processing during normal non-database restart. At 218 a check is made of whether a request has been made to open a table. If not, then an error message is returned at 220. An open table request is a request to begin processing of a new table. If such a request is received by the process, then at 222 the procedure is begun to recreate the index file. The beginning of such a procedure at 222 is to delete the error index file. Once this has been done at 224 the first index definition is located using the system index table. Using this first definition at 226 the process begins to create or recreate the index as defined in 224. At 228 a check is made of whether all indexes have been created yet. If not, at 230 the next index definition is retrieved and a loop back to 226 occurs wherein that fetched index is recreated. Again continuing to check 228, if all indexes have been created, then at 232 the "open table" request is completed and a successful return at 234 occurs.

FIG. 11 is a flow diagram illustrating recreation of all error index files after completion of system restart. At 236 system restart has actually been completed and the operation is being commenced which creates all of the index files. At 238 the list of all error index files is fetched. This is after a point where prior error has occurred and a system crash while attempting to recreate the index files, in which case a list at 238 will exist. However, if a prior error and crash has not occurred, the list obviously will be empty. At 240 this fetched list will be added to any new error index files. This is accomplished by checking the directories to see if there are any error index files and if so adding them to the list of error index files. At 242 the first file on the list is fetched. At 244 a check is made to see if all items on the list have been processed. If not, at 246 the file is opened for update. At 252 a check is made to determine if the open was successful, and if so the item is removed from the list 254. After being removed, the next entry is pointed to at 256 and a loop back to 244 occurs wherein a check is again made to determine whether all items on the list have been processed. At 252 if the open was not successful, there is a point to a next entry at 256. Returning to 244, if all items on the list have been processed, the list on disk is updated at 248 and the process is ended at 250.

Figure 12:
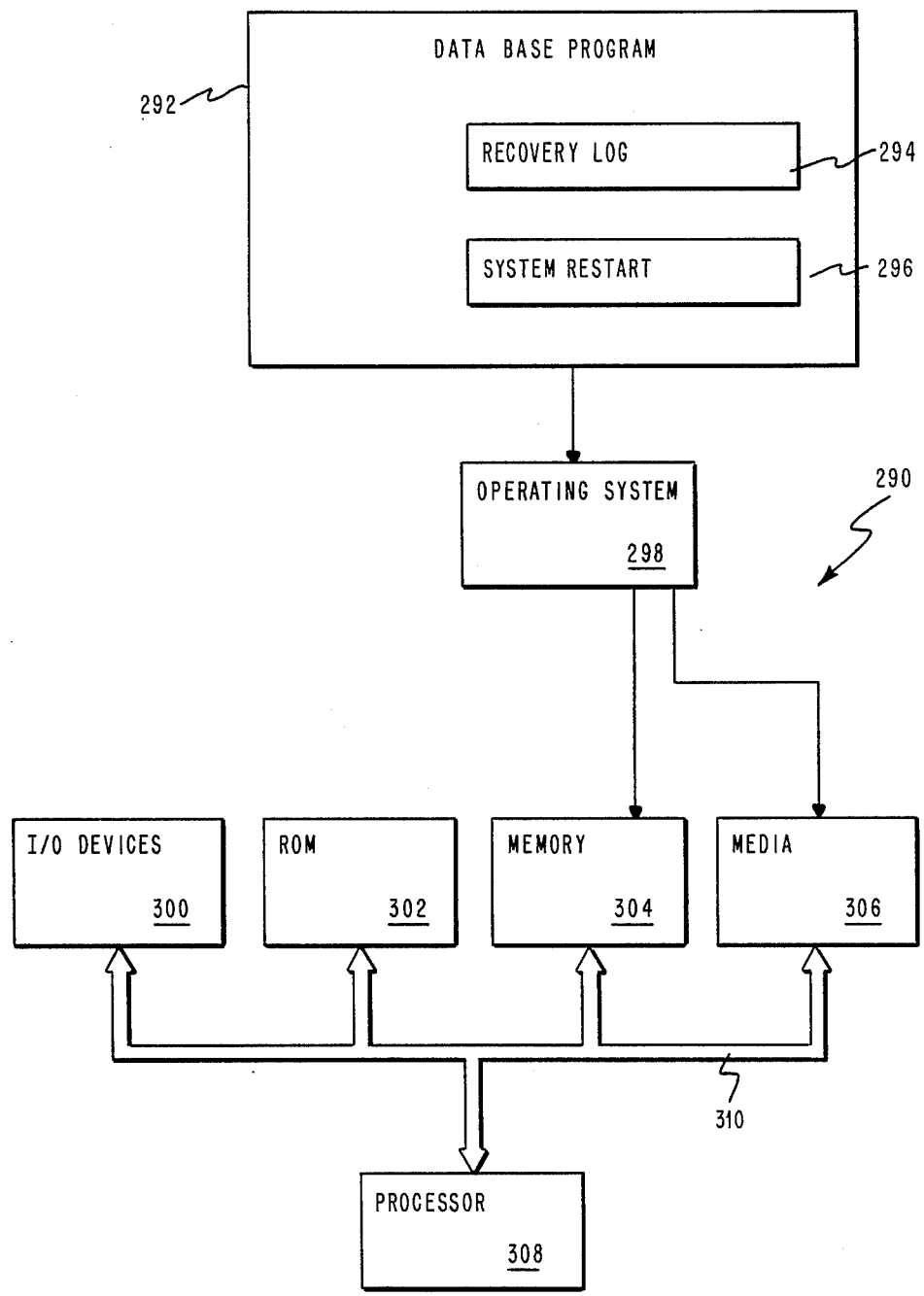
FIG. 12 is a general functional block diagram illustrating a computerized system in accordance with the invention for executing the routines described with reference to FIGS. 5-11.

With reference to FIG. 12, a block diagram is shown of a processing apparatus which may be used to run computer programs providing the function of the previously described algorithms, thereby implementing the system of the present invention. The system preferably takes the form of a typical personal computer architecture such as that embodied in the IBM Personal System/2. With respect to this system 290, a microprocessor 308 is provided such as an Intel 80286 or 80386 device which is interconnected to a desired selection of I/O devices 300, ROM 302, memory 304, and media 306 by means of a bus 310. It will be appreciated that in a conventional manner, the bus 310 will be comprised of address, command, and data lines for purposes well known in the art. The I/O devices 300 which may be included in the system 290 of the present invention may include a display such as an IBM Personal System Color Display 8510, a keyboard, mouse or the like for user input, and a printer if desired. It will also be appreciated that for purposes of simplicity, adapters have been omitted from FIG. 12 although it will be appreciated that such adapters for the various devices 300-306 may either be included as part of the IBM Personal System/2 or available as plug in options from the IBM Corporation.

Within the read only memory or ROM 302, the basic input/output operating system or BIOS is stored for execution by the processor 308. The BIOS, as is well known, controls the fundamental operations of the computer system 290. Additionally, an operating system 298 is provided such as OS/2 which will be loaded into memory 304 and will run in conjunction with the BIOS in ROM 302.

Additional information on the Personal System/2 and Operating System OS/2 which may used in a preferred embodiment to implement the system and methods of the present invention may be found in the following reference manuals herein incorporated by reference: IBM Operating System/2 Version 1.0 Standard Edition Technical Reference, IBM Corporation Part No. 6280201, Order No. 5871-AA, Technical Reference Manual, Personal System/2 (Model 80), IBM Corporation, Part No. 68X2256, Order No. S68X-2256; and OS/2 Programmer's Guide, Iacobucci, Ed, McGraw Hill 1988.

In accordance with the invention, an application program 292 is further provided which may be loaded into memory 304 or stored in media 306. This media 306 may be of any conventional form such as a hard file, diskettes associated with a disk drive, or the like. In accordance with OS/2, the data base application program 292 may be considered as an operating system 298 extension and will include numerous functions conventionally associated with a database program providing instructions to the processor 308 so as to enable the system 290 to perform relational database functions as hereinbefore described. The operator may interface with the database program through the various I/O devices 300, such interfacing including entering, accessing, changing, or deleting data from the database and other such tasks. For example, the user may interact with the database program 292 by inputting some form of data manipulation language command such as an SQL command well known in the art via the keyboard, whereupon the system 290 will query the data resident in the database and output the desired answer set for inspection by the user on a video terminal, printer, or the like.

It will be noted that software functions included in the database program 292 include recovery log functions 294 and system restart functions 296. These functions, graphically and conceptually represented in FIG. 12 as part of the database program 292, will be recognized as performing the hereinbefore described functions of the present invention relative to generating a recovery log and effecting system restart in the manner of the invention.

While the invention has been shown and described with reference to particular embodiments thereof, it will be understood by those skilled in the art that the foregoing and other changes in form and details may be made therein without departing from the spirit and scope of the invention.

We claim:

1. In a computerized database system including a storage medium for storing data files, index files, and a recovery log having a plurality of files, and a CPU for I/O to said storage medium, a method executed by said system for recovering a database after an I/O error, comprising the steps of:

(a) writing log records during normal forward processing to said recovery log on said storage medium;

(b) traversing across said recovery log on said storage medium during RESTART routine processing after said I/O error for detecting committed and uncommitted transactions, said RESTART routine including a REDO sub-routine for redoing committed transactions recorded in said recovery log;

(c) detecting said written log records in said recovery log which are incomplete or failed;

(d) executing a recovery routine;

(e) executing an UNDO routine for undoing said detected uncommitted transactions;

(f) renaming said files on said storage medium having said I/O error;

(g) storing in a first file on said storage medium indicators of said renamed files that identify said renamed files as error files;

(h) accessing said first file for said indicators;

(i) preventing a subsequent RESTART routine from accessing said identified I/O error files in response to said accessing said first file;

(j) continuing said RESTART routine in response to said accessing said first file while preventing operations on said identified I/O error files during said continued RESTART routine;

(k) generating a request for access to one of said data files on said storage medium having a corresponding index file;

(l) accessing said one of said data files on said medium to determine whether said corresponding index file has been renamed thereby indicating said corresponding index file is an error index file;

(m) rebuilding said index file in response to said determination of said error index file.

2. The method of claim 1 wherein a plurality of said log records comprises a log record page residing on said medium;

a maximum I/O page size comprises a memory page; and wherein said step of writing said log records further comprises detecting when the size of said log record page is substantially equal to that of said memory page;

writing a substantially full log record page to an nth page of said recover log on said medium.

3. The method of claim 2 wherein said step of writing said log records further comprises the steps of detecting when the size of next ones of said log record pages is less than that of said memory page; and in response thereto alternating writing said next ones of said log record pages to alternating page locations in said log.

4. The method of claim 1 further including generating an error status when one of said identified filed is a data files; and returning said error status to an application program seeking access to said data file.

5. The method of claim 1 further including generating an error status when one of said identified files comprises a long filed file; and returning said error status to an application program seeking to access said long field file.

6. The method of claim 1 further including the step of preventing return of error status to an application program seeking to access said error index file.

7. The method of claim 6 including the steps of providing a configuration option rebuild indicator for requesting error index rebuilds;

executing a RESTART UNDO routine;

setting said rebuild indicator;

detecting that said rebuild indicator is set; and performing said index file rebuild in response to said detection of said indicator being set.

8. The method of claim 1 wherein said I/O error is an incomplete log write or a detected log write failure.

9. In a computerized database system, a method of generating a recovery log for use in a relational database system having a data file and an index file, comprising the steps of:

initializing a plurality of log pages;

generating a plurality of log records;

writing to media a full log page of said records in one of said initialized log pages having a page number n;

writing to said media in response to said system sub-pages of said records in next ones of said initialized log pages having respective alternative and consecutive page locations numbers $n+1$ and $n+2$;

detecting an I/O error in at least one of said written full pages or sub-pages; and preventing additional said writes to said media in response to said detected I/O error, wherein said I/O error is a detected log write failure or an incomplete log write on said index file.

* * * * *